Figures 1, 2:
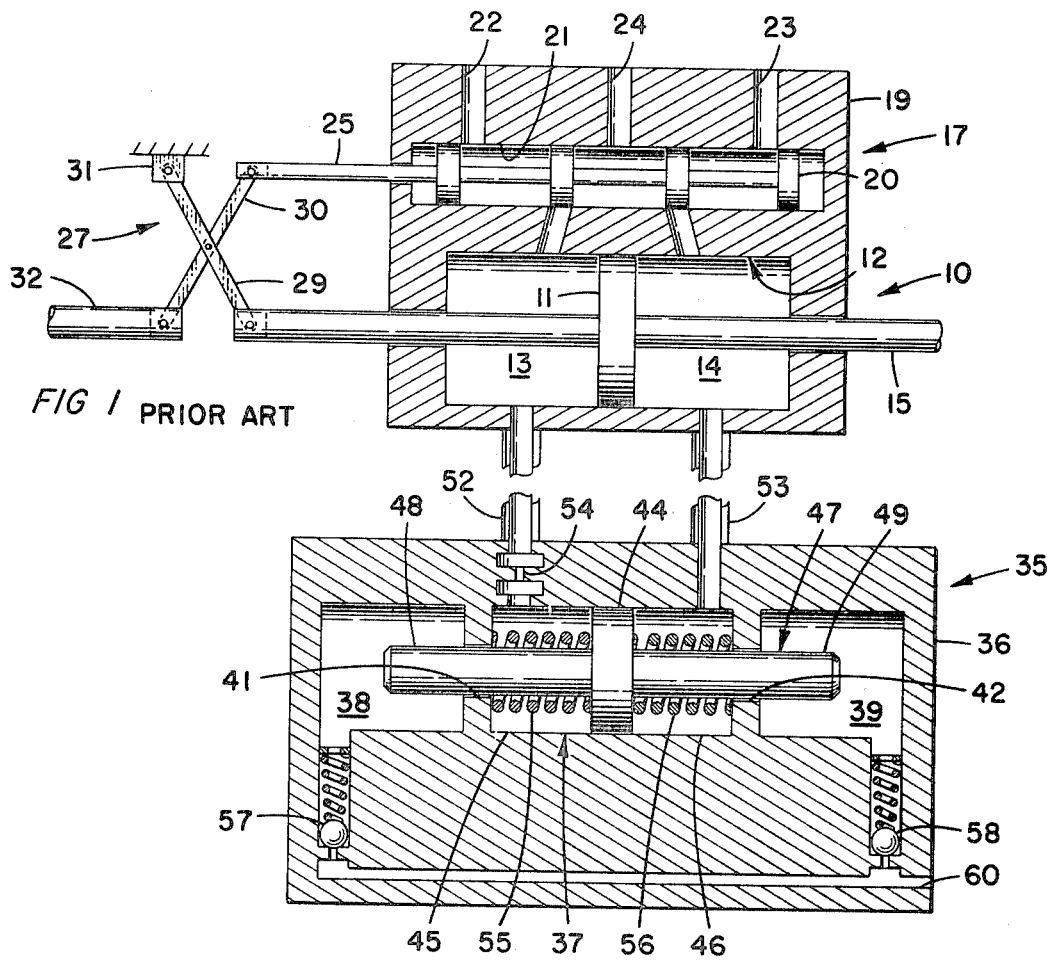

United States Patent

Koch

[15] 3,648,570
[45] Mar. 14, 1972

[54] APPARATUS FOR DAMPING RESONANT VIBRATION

[72] Inventor: Werner G. Koch, Arlington, Tex.
[73] Assignee: LTV Aerospace Corporation, Dallas, Tex.
[22] Filed: June 22, 1970
[21] Appl. No.: 48,235

[52] U.S. Cl..................................................92/60, 92/143
[51] Int. Cl..................................F01b 11/02, F01b 29/00
[58] Field of Search..................92/143, 8, 60, 85, 134; 188/311, 312; 267/136, 150, 118, 124, 126; 138/31; 91/418

[56] References Cited

UNITED STATES PATENTS

| 2,402,887 | 6/1946 | Greeley | 92/60 |
| 2,747,370 | 5/1956 | Traut | 138/31 |
| 2,753,849 | 7/1956 | Becker | 91/38 |
| 2,780,065 | 2/1957 | Spannhake | 138/31 X |
| 2,925,262 | 2/1960 | Zumwalt | 267/126 |
| 3,264,942 | 8/1966 | Witt | 92/143 X |
| 3,470,692 | 10/1969 | Kamp | 92/134 X |

FOREIGN PATENTS OR APPLICATIONS

| 396,343 | 8/1933 | Great Britain | 267/150 |

Primary Examiner—Edgar W. Geoghegan
Assistant Examiner—Irwin C. Cohen
Attorney—James M. Cate and H. C. Goldwire

[57] ABSTRACT

An apparatus for damping resonant vibration within a hydraulic system having a hydraulic actuator slidable within a piston chamber and dividing the chamber into first and second chamber portions. Frictional and resilient means are employed for damping vibration, the resilient means comprising hydraulic spring means connected in series with a passageway communicating between the first and second chamber portions.

8 Claims, 2 Drawing Figures

PRIOR ART

Patented March 14, 1972

3,648,570

WERNER G. KOCH
INVENTOR

BY James M. Cate

ATTORNEY

APPARATUS FOR DAMPING RESONANT VIBRATION

This invention relates to damping apparatus and, more particularly, to a damping apparatus for damping resonant vibration within a hydraulic system employing a hydraulic actuator.

The use of hydraulic servo systems in which hydraulic actuators are employed to position various movable elements in response to hydraulic pressure signals is well known. Such systems normally employ an actuator of the type having a piston slidably mounted within a piston chamber and movable therein in response to any pressure differential across the piston. The actuator piston is normally connected by an actuator rod to a movable element or load having some degree of inertia. In certain applications of such hydraulic systems, a major problem has been the control of resonant vibrations which may occur within the system as a result of transient pressure changes within the hydraulic circuit, e.g., as when pressure is suddenly increased or decreased by the opening or closing of a valve or, secondly, as a result of vibrations occurring in the load and transmitted therefrom to the hydraulic actuator. Such systems have a natural resonant frequency (which is dependent upon the spring rate of the hydraulic fluid filling the system and upon the elastic properties of the housing and conduits enclosing the fluid), and thus, any vibrations occurring at this frequency tend to be reinforced by resonant vibration of the system, which may produce damaging and possibly dangerous effects. In aircraft control systems, for example, the control surfaces are positioned by means of a hydraulic servo system in response to movement of the pilot's controls. Each respective control surface element tends to vibrate during flight as a result of turbulence in the adjacent airflow and vibration transmitted from the engines, and such vibrations are transmitted to a hydraulic actuator connected to the respective control surface element. Often, such aircraft hydraulic systems employ mechanical summing linkages connected between the actuator piston and a control valve which controls the flow of fluid to the actuator, and in such systems vibrations within the hydraulic system may be fed back through portions of the control linkage to the control valve and cause further reinforcement of the resonant vibrations, as will be more fully understood from the description to follow.

In the past, several methods for attenuating such resonant vibration within hydraulic systems have been proposed. Such methods typically utilize a combination of restrictive orifices and mechanical springs for damping vibrations in a manner somewhat analogous to the use of springs and shock absorbers in automobiles. For example, a bypass conduit may be connected between the two chamber portions formed within an actuator piston chamber on opposite sides of the actuator piston such that sudden, excessively high pressures on either side of the piston are shunted to the other side to relieve extreme pressure differentials across the piston before severe resonances can occur. Means are installed within such bypass conduits to permit the equalization of sudden and extreme pressure differentials but to prevent the loss of normal, applied pressure differentials across the actuator piston in order to permit desired movement of the piston. Such selectivity is commonly provided by the installation of a damping chamber and piston connected in series with the bypass conduit, the conduit communicating with the damping chamber through respective inlets formed through opposite end portions of the damping chamber and on opposite sides of the damping piston. The damping piston is ordinarily centered within the chamber by two heavy, coiled, pressure relief springs disposed coaxially within the chamber on opposite ends of the piston and footed, respectively, against opposite end faces of the piston. Increased pressure within the actuator chamber on one side of the actuator piston is transmitted through a first portion of the bypass conduit to one end of the damping piston chamber such that a pressure differential is created across the damping piston. The damping piston is thus displaced and causes fluid on its opposite side, within the damping chamber, to flow through the second portion of the bypass conduit and return to the other side of the actuator piston to partially equalize the sudden pressure differential across the actuator piston and oppose any sudden movement thereof. However, movement of the damping piston is opposed by the heavy, mechanical, pressure relief springs, so that normal pressure differentials across the actuator piston will not be sufficient to induce significant fluid flow through the bypass. Thus, the system responds somewhat selectively and is significantly activated only by pressure pulses of sufficient magnitude to overcome the opposing force of the pressure relief springs. The damping system may also include restrictive orifices formed in the bypass conduit to further dampen fluid flow therethrough. A major problem of such damping systems is that, in hydraulic systems wherein high pressures are required in normal use, the heavy relief springs must be of massive and herein, configuration in order to prevent significant fluid flow through the bypass during normal operation of the actuator so that the damping piston is not displaced significantly in response to normal pressure differentials across the actuator piston. Thus, the mechanical springs add a substantial amount of weight and bulk to the damping system, such bulk and weight being a serious disadvantage in such applications as aircraft control systems where size and weight are of critical importance. Moreover, such massive, heavy springs are expensive and difficult to install. Because such damping mechanisms typically also employ a multiplicity of hydraulic conduits, additional springs, and orifices, they are also complex and expensive to manufacture and service. A further disadvantage of such a complex system is that the damping apparatus is satisfactorily effective in damping only an undesirably narrow band of vibrational frequencies. It is believed that this limited frequency range of prior damping devices is caused by the nonlinear resistive effects of the many conduits, springs, and other components upon fluid flow of varying flow rates.

Alternate methods which have been proposed include the use of piston "bleed orifices," which are small, restrictive orifices drilled directly through the actuator piston such that excessive pressure on one side is bled to the other side. This method has the obvious disadvantage that control pressure is continuously wasted by the bleed orifice and the further disadvantage of allowing "static backoff" of the actuator piston, i.e., slippage of the actuator piston and the load element from a selected position as a result of fluid flow through the bleed orifice. Thus, accurate positioning of the actuator piston is unobtainable. Another method has included sensing resonant vibration and positively injecting an opposing hydraulic signal into the hydraulic system in such a way that resonant vibrations are opposed by the injected fluid signals. Such systems require additional extensive valving and may employ complex electrical circuits, such complexity increasing both the cost of the systems and their susceptibility to malfunction under high stress conditions.

It is, accordingly, a major object of the present invention to provide a new and improved damping apparatus for the damping of vibration within hydraulic systems of the type having a hydraulic actuator connected to a movable load.

A further object is to provide such a damping apparatus in which the need for heavy, expensive, mechanical pressure relief springs is obviated.

Yet another object is to provide such a damping apparatus in which fluid is not continuously bled from the actuator chamber under normal operating conditions such that accurate hydraulic actuator response to hydraulic control signals is permitted.

A still further object is to provide a method for damping resonant vibrations within a hydraulic servo system wherein vibrations occurring over a broad spectrum of frequencies are effectively dampened.

Still another object is to provide a damping apparatus having the above-stated advantages which, nevertheless, has few moving parts and is of inexpensive, reliable, and practical construction.

Other objects and advantages will be apparent from the specification and claims and from the accompanying drawing illustrative of the invention.

In the drawing:

3

FIG. 1 is a diagrammatic, longitudinal, sectional view of a hydraulic actuator and associated control valve and linkage elements, all known in the art; and FIG. 2 is a similar view of a damping apparatus according to the present invention.

In the description to follow, directional terminology, such as "leftward," "rightward," "clockwise," and "counterclockwise," is used with reference to the apparatus as viewed in the drawing for the sake of clarity of description and is not to be construed as limiting the apparatus to a particular configuration. While an embodiment of the damping apparatus is described herein as employed in a typical aircraft hydraulic system, the apparatus is, of course, not limited to such an application or to the specific, exemplary embodiment described.

With reference to FIG. 1, a hydraulic actuator 10 includes a housing 19 enclosing an actuator chamber 12, an actuator piston 11 being slidably mounted within the chamber 12 and dividing the chamber into first and second chamber portions 13 and 14. Such actuators are, of course, well known in the art and may be enclosed in individual housings, as shown, or may be housed integrally with other portions of a hydraulic system. The exemplary actuator 10 is of the double-acting type, having the capability of hydraulically actuated movement in two directions. An actuator rod 15 is affixed coaxially to the piston 11 and extends longitudinally from the piston in opposite directions (leftwardly and rightwardly as viewed in the drawing) through corresponding openings formed in the housing 19, the rightward portion of the rod being connected to a load (not shown). A control valve 17 is also mounted within the actuator housing 19 and includes a spool valve structure 20 slidably seated within a bore 21 formed in the actuator housing 19, the bore being disposed adjacent and parallel to the actuator chamber 12. The housing 19 further includes an inlet 24 communicating between the bore 21 and a source of hydraulic fluid under pressure (not shown) and includes first and second outlets 22, 23 communicating with the bore 21, the inlet 24 being positioned at a point intermediate the outlets 22, 23. The spool valve structure 20 includes a plurality of spools affixed coaxially to a valve rod 25, the rod having leftward extension without the actuator housing 19 through a suitable opening. The spools are spaced along the valve rod 25 and positioned such that movement of the rod 25 is effective to conduct hydraulic fluid from the inlet 24 to selected ones of the chamber portions 13, 14 through suitable passageways communicating, respectively, between the bore 21 and the chamber portions.

The operation of such control valves and hydraulic actuators is well known in the art. Summarily, hydraulic fluid under pressure is conducted by the valve structure 20 into one of the chamber portions 13, 14 to create a pressure differential across the actuator piston 11 and urge it, and the load, in a desired direction. The present exemplary structure further includes a summing linkage 27 of a type employed in aircraft control systems to allow the pilot to accurately position the control surface element. The linkage 27 comprises first and second connecting bars 29, 30 which are pivotally connected to each other at their respective midpoints, the first connecting bar 29 being pivotally connected, at its respective end sections, between the leftward extension of the actuator rod 15 and a grounded fastener 31 which, in the present embodiment, is affixed to the structure of the airplane. The second connecting bar 30 is similarly connected, at its end portions, between the leftward extension of the valve rod 25 and a push rod 32 which, in turn, extends to and is actuated by the pilot's controls. Rightward movement of the push rod 32 causes a leftward movement of the valve 25 which permits hydraulic fluid to flow from the inlet 24, through the valve bore 21, and into the first chamber portion 13 to urge the actuator piston 11 to the right. This rightward movement of the actuator piston 11 and rod 15 pulls the first connecting bar 29 to the right, which causes the second connecting bar 30 to pivot clockwise at its pivotal connection with the push rod 32 thereby pushing the valve rod 25 to the right and back to its original, centered position (FIG. 1) at which the inlets 22, 23 are effectively closed. Leftward movement of the push rod 32 causes a similar reaction of the piston 11 in a leftward direction. The above-described hydraulic system is typically employed in the aircraft art to effect movement of the control surface element (not shown), which element is operably connected to the rightward extension of the actuator rod 15.

Any vibrational stresses transmitted to the actuator piston 11 from the control surface element, as a result of vibration of the control surface element due to air turbulence or as a result of sudden applications of hydraulic power, may tend to set up undesired resonant vibrations within the hydraulic actuator and system. Additionally, these resonances may be reinforced by the linkage 27 and valve structure 20. Normally, the linkage 27 acts to return the actuator piston 11 to a desired, preselected position upon its being displaced therefrom by rightward or leftward force upon the rod 15. If, for example, the portion of the control surface element which is connected to the rightward extension of the rod 15 is moved to the left, the first connecting bar 29 and the second connecting bar 30 are urged to the left, thereby pulling the valve structure 20 to the left. This leftward movement of the valve structure 20 permits fluid to flow from the inlet 24 to the left chamber portion 13 to urge the actuator piston 11 and rod 15 to the right until the desired, predetermined position is reached. However, if the control surface element or load is caused to vibrate at a high frequency, there may be a time lag in the corrective reaction of the linkage 27 and valve structure 20, partially because of the resiliency of the metal parts, such that a resonant condition is reached wherein the corrective action of the linkage 27 is out of phase with the vibration of the load and tends to reinforce the oscillation of the load until structural failure results. While hydraulic circuits of the type represented by the present, exemplary, summing linkage 27 and control valve 17 thus present particularly serious vibrational problems, all hydraulic actuators connected to inertial loads may suffer from vibrational stress upon sudden applications of hydraulic power or sudden movement or vibration of the load itself.

With respect now to the present invention, the above-described actuator 10 and valve 17 are combined with a damping apparatus 35 comprising a housing 36 which encloses a damping piston chamber 37 having an axis and preferably being of cylindrical configuration. First and second compression chambers 38, 39, suitably of cylindrical configuration, are also formed within the housing 36 and are disposed coaxially of the damping chamber 37 on opposite sides thereof. The first and second compression chambers 38, 39, are entirely filled with a slightly compressible liquid, for reasons given in detail in the description to follow, and may also be termed first and second, liquid-filled chambers. A first passageway 41 communicates between the damping chamber 37 and the first compression chamber 38 and a second passageway 42 communicates between the damping chamber and the second compression chamber 39, the first and second passageways preferably being of cylindrical configuration and disposed coaxially of the damping chamber 37. A damping piston 44 is slidably and sealingly seated within the damping chamber 37 and divides the chamber into first and second cavities 45, 46, the piston suitably being lap fitted, i.e., machined to close tolerances such that it seats closely against the walls of the damping chamber, for providing sealing association with the housing. A piston rod or connecting means 47 is affixed coaxially to the damping piston 44 and thus extends coaxially of the damping chamber 37, the piston rod 47 having a first end portion 48 which extends through the first passageway 41 and within the first compression chamber 38 and a second end portion 49 extending in the opposite direction, through the second passageway 42, and within the second compression chamber 39. The piston rod 47 is of cylindrical configuration and is lap fitted within the first and second passageways 41, 42 such that it has sealing and sliding association with the housing 36 within the passageways and such that the first and second piston rod portions 48, 49 form plungers or pistons within the first and second compression chambers 38, 39, respectively. Preferably, the piston rod portions 48, 49 each have respective piston face areas substantially smaller than the piston face area of the damping piston 44, for reasons which will become apparent from the description to follow.

A first conduit means 52 is provided having extension between the actuator housing 19 and the damping apparatus housing 39 and providing communication between the first chamber portion 13 and the first cavity 45, and a second conduit means 53 similarly communicates between the second chamber portion 14 and the second cavity 46. In the present embodiment, the conduit means 52, 53 extend between the separate housings 19, 36 and include conduit tubing connected between the housings and communicating with passageways formed within the housings. However, the damping apparatus 35 and actuator 10 are alternately formed integrally, within a single housing, in which case the conduit means 52, 53 comprise passageways formed through the single housing. A restrictive orifice 54 is formed in at least one of the conduit means 52, 53, and in the present embodiment it is formed within the damping apparatus housing 36 in series with the first conduit 52. In the preferred embodiment, means are also provided for urging the damping piston 44 to a central position within the damping piston chamber 37 and suitably comprise first and second, coiled, centering springs 55, 56 mounted coaxially within the first and second cavities 45, 46, respectively, and coaxially around the rod 47. The springs 55, 56 are footed under compression against respective, opposite ends of the damping piston 44 and against the housing 36.

During normal operation, all of the hydraulic passageways and chambers are filled with hydraulic fluid, i.e., the valve bore 21, the first and second chamber portions 13, 14, the first and second cavities 45, 46, and the first and second damping chambers 38, 39. Additionally, means are provided for supplying hydraulic fluid to the first and second compression chambers 38, 39 upon fluid pressure within these chambers falling below a preselected level. Preferably, first and second unidirectional check valves 57, 58 communicate, respectively, with the first and second compression chambers 38, 39 and are in communication, through their respective inlets, with a supply passageway 60. The supply passageway 60 communicates between the two check valves 57, 58 and a source (not shown) of hydraulic fluid under slight pressure, e.g., of approximately 5 p.s.i. The check valves 57, 58 are suitably mounted within respective bores communicating at right angles with the first and second compression chambers 38, 39 and are suitably of the ball closure type in which spring tension urges a spherical closure member against a corresponding valve seat to a closed position.

The damping apparatus 35 is effective to attenuate a relatively broad spectrum of vibration within the actuator 10; however, it is preferably tuned to the resonant frequency of the hydraulic system and load such that maximum efficiency of operation is obtained. It has been determined that optimum damping is obtained by configuring the restrictive orifice 54 and the piston rod portions 48, 49, as follows:

$$A_o = (\omega A_p^2)/(K_p C_o)$$

wherein: $A_o$ is the total effective orifice area; $\omega$ is the resonant frequency of the hydraulic system and the load; $A_p$ is the total piston-face area on one side of the damping piston 44; $K_p$ is the spring rate of the hydraulic liquid within the compression chambers 38, 39; and $C_o$ is a function of force produced by the actuator piston 11, and normally is about 3.0. $A_o$, the effective orifice area within the first and second conduits 52, 53, may be determined by the relationship:

$$(A_1 \times A_2)/(\sqrt{A_1 + A_2})$$

wherein $A_1$ is the cross-sectional area of the orifice opening 54 and $A_2$ is the smallest internal cross-sectional area of the second conduit 53. As an example, in the present embodiment for aircraft application, in which an actuator rod 15 is connected to an airplane control surface, the exemplary damping apparatus 35 has an orifice 54 with an area of 0.0163 in.², first and second piston rod portions 48, 49, of 0.3 inches diameter, respectively, and a damping chamber 37 1 inch in diameter.

In normal operation of the actuator 10, the hydraulic fluid within the compression chambers 38, 39 acts to oppose any leftward or rightward movement of the piston rod 49 and damping piston 44, and thus, fluid flow through the conduits 52, 53 is blocked by the damping piston 44. In such a condition, the damping apparatus 35 has little effect upon the relative pressures within the actuator chambers 13, 14. However, upon the occurrence of a change in the differential pressure across the actuator piston 11 such as would occur upon movement of the valve structure 20 from its central position or upon movement of the actuator rod 15, and load, the damping apparatus 35 becomes increasingly effective. For example, assume that the push rod 32 is displaced sharply to the left as a result of a sudden movement of the pilot's controls. Such a leftward movement tends to rotate the second connecting bar 30 in a clockwise direction and, in turn, urges the spool valve structure 20 quickly to the right to permit a sudden flow of hydraulic fluid under pressure from the inlet 24 to the second actuator chamber portion 14. Quickly increasing pressure within the second chamber portion 14 causes a sharp, leftward movement of the actuator piston 11 and the actuator rod 15, with the result that possible transient vibrations may be built up within the system, apart from the corrective action of the damping apparatus 35 now to be described. Upon the occurrence of a sudden increase in pressure in the second chamber portion 14, fluid is urged through the second conduit 53 and into the second cavity 46. This increase in pressure within the second cavity 46 urges the damping piston 44 in a leftward direction, or toward the first compression chamber 38. The leftward movement of the damping piston 44 causes fluid to flow from the first cavity 45, via the conduit 52 and through the restrictive orifice 54, to the first chamber portion 13, resulting in increasing fluid pressure within the first chamber portion 13; this increasing pressure within the first chamber portion decreases the severe fluid pressure differential across the actuator piston 11 and prevents or dampens any sudden, severe movement of the piston 11. Additionally, fluid flow through the restrictive orifice 54 is resisted by the orifice, and the energy of the sudden pressure surge is partially dissipated in heat produced by friction associated with rapid fluid flow through the orifice.

As the damping piston 44 moves to the left, the first portion 48 of the piston rod 47 extends into the first compression chamber 38 and decreases its available fluid volume. This results in rapidly increasing pressure within the first compression chamber 38 which compresses the hydraulic fluid within the first compression chamber, the compressed fluid acting to resiliently resist further leftward movement of the piston rod 47 in a manner analogous to a mechanical or pneumatic spring under compression. The pressure within the first compression chamber 38 is soon much greater than that within the second cavity 46 because of the mechanical advantage derived from the use of the piston rod portion 48 of smaller area than the effective, piston-face area of the damping piston 44. However, the actual force exerted on the face of the first piston rod portion 48 soon equals the force urging the actuator piston 11 to the left, whereupon the leftward movement of the damping piston 44 and the piston rod 47 ceases. At this point, the total hydraulic pressure differential across the actuator piston 11 is applied to the piston rod 15 and its load. Thus, the combined effects of the orifice 54 and the resistance of the first piston rod portion 48 and first compression chamber 38, which may be termed "the first liquid spring means," and the second piston rod portion 49 and the second compression chamber 39, termed the "second liquid spring means," act to effectively dampen sudden applications of hydraulic power to the actuator piston 11, but do not continuously drain power from the system, and, upon the steady-state condition described above being reached, all further hydraulic power is applied to the load. It can be seen that the piston rod 47 serves as a connecting means to connect the damping piston 44 to the first and second liquid spring means. Very sudden pressure increases are largely resisted by the restrictive orifice 54, and the orifice also serves to minimize any tendency of the damping piston 44 to rebound after being suddenly displaced in one direction. The utilization of the compressibility of the hydraulic fluid to effect resilient opposition to sudden pressure pulses is made possible by the mechanical advantage provided by the damping piston 44 and the end portions 48, 49 of the piston rod 47. As outlined above, the piston-face area of the damping piston 44 is considerably greater than that of the piston rod end portions 48, 49, such that a given pressure differential across the damping piston 44 results in a proportionately greater pressure within the respective compression chamber into which the piston rod 47 moves. This permits a significant degree of compression of the hydraulic fluid within that compression chamber.

The centering springs 55, 56 act to maintain the damping piston 44 in a central position within the damping piston chamber 37. However, they exert insignificant force upon the piston 44 relative to the forces produced by hydraulic pressures within the cavities 45, 46 and have little effect upon the damping characteristics of the damping apparatus 35. During steady-state conditions, some slight amount of hydraulic fluid seeps through the sealed areas around the piston rod 47 within the first and second passageways 41, 42 and permits the centering springs 55, 56 to move the damping piston 44 to a central position. The first and second check valves 57, 58 are normally closed, but upon fluid pressure within one of the compression chambers 38, 39 being suddenly decreased, fluid is permitted to flow into that chamber to prevent cavitation and to ensure that the compression chambers 38, 39 are full of hydraulic fluid at all times. This action may leave the damping piston 44 in an uncentered position. Thereafter, however, the centering springs 55, 56 act to return the damping piston 44 to its central position and to slowly bleed any excess fluid from either of the compression chambers and dissipate the fluid through the hydraulic system. The centering springs 55, 56 are not to be confused with the massive, pressure relief springs described earlier as used in previous damping devices, wherein the springs themselves act to resist sudden hydraulic pressure differentials as do the hydraulic compression chambers 38, 39 and the piston rod 47 of the present invention.

Great efficiency of size and weight are achieved in the present system because of the fact that the spring rate produced by the hydraulic springs, i.e., the rod portions 48, 49 acting upon the slightly compressible hydraulic fluid within the first and second compression chambers 38, 39, is substantially higher than that of metal springs of similar size. That is, to obtain the capacity of the hydraulic springs with conventional, mechanical springs would require the use of springs and a corresponding housing of much larger dimensions. As an example, assume that the volumes of the respective compression chambers 38, 39 are 2 in.³ and that the areas of the rod end portions 48, 49 are 0.3 in.², respectively. The well-known relationship defining the compressibility of liquid within a chamber (e.g., of a hydraulic fluid within a respective one of the compression chambers) is given by:

$$\beta = \frac{V}{dv/dp} \quad (1)$$

wherein $\beta$ is the bulk modulus, in pounds per square inch, of the hydraulic liquid, $V$ is the volume of the respective compression chamber, $dv$ is the change in liquid volume (as a result of movement of the rod 47), and $dp$ is the change in liquid pressure, in pounds per square inch, due to the change in liquid volume, $dv$.

Rewriting equation 1:

2. $dp = (\beta\, dv)/V$, or
3. $dp = (\beta\, SA)/V$ where $A$ is the cross-sectional area of the rod 47 in (inches)², and $S$ is the stroke of the rod 47. The bulk modulus, $\beta$, of most hydraulic fluids is approximately 200,000 lbs./in.². The present, exemplary damping apparatus 35 employs a rod 47 of approximately 0.3 in.² in area and a compression chamber (38 or 39) having a volume $V$ of 2 in.³. A sharp, sudden pressure differential across the actuator piston 11 produces, for example, a displacement $S$ of the damping piston 44 and rod 47 of approximately 1 inch. Substituting these values in equation (3):

$$dp = \frac{(200{,}000)(1.0)(0.3)}{2} = 30{,}000 \text{ lbs./in.}^2 \quad (4)$$

This change in pressure acts on the piston rod area of 0.3 in.², resulting in a spring rate of 9,000 pounds per inch displacement. By way of comparison, coiled springs used in automotive suspensions have a spring rate of only approximately 200–600 lbs./inch displacement, yet are considerably larger than the present structure.

In spite of the improved efficiency provided by the present damping apparatus 37, however, the apparatus is not of increased complexity or criticality of construction as compared with prior art devices. In fact, it is of far simpler construction than the great majority of prior devices, needs no complex valving or electrical circuit, and employs very few moving parts. The hydraulic compression method eliminates the problem of "static backoff" of the actuator piston caused by slippage of the actuator piston because of fluid flow through a bleed orifice; in the present system, no bleed orifice or open conduit exists between the first and second actuator chamber portions 13, 14. The damping piston 44 is interposed between the first and second conduits 52, 53 and thus prevents continuous fluid flow therethrough. The present damping apparatus is effective to dampen vibrations over a wide range of frequencies, and is substantially linear in its response, because of its elimination of the many conduits, valves, etc., of the prior systems. Such conduits and valves resist fluid flow therethrough, and their resistance is not linear with respect to fluid pressure, such that they act with varying efficiency at differing frequencies. The present apparatus requires only minimum lengths of conduit and the hydraulic springs respond in a substantially linear manner with respect to the pressure differential across the damping piston 44.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. In combination with a hydraulic actuator of the type having a piston slidably mounted in an actuator chamber and dividing the chamber into first and second chamber portions on opposite sides of the piston, an actuator rod connected between the piston and a load, and means for selectively conducting hydraulic fluid to the respective chamber portions, a damping apparatus comprising:

a housing enclosing a damping piston chamber having an axis, the housing also enclosing first and second compression chambers intersected by said axis and disposed on opposite sides of the damping piston chamber;

a damping piston slidably and sealingly seated within the damping piston chamber and dividing said chamber into first and second cavities, the housing having a first passageway communicating between the first cavity and the first compression chamber and a second passageway communicating between the second cavity and the second compression chamber;

a piston rod affixed to the damping piston and having a first portion extending from the damping piston, through the first passageway, and within the first compression chamber and also having a second portion extending from the damping piston, through the second passageway, and within the second compression chamber, the piston rod having sealing and sliding association with the housing within the first and second passageways, whereby the first and second piston rod portions form pistons projecting within the first and second compression chambers, respectively;

first conduit means communicating between the first chamber portion and the first cavity and second conduit means communicating between the second chamber portion and the second cavity;

a hydraulic fluid filling the chamber portions, cavities, compression chambers, and conduit means;

means for restricting fluid flow through at least one of the conduit means.

2. The apparatus of claim 1, further comprising:

means for supplying a hydraulic liquid to the first compression chamber upon the fluid pressure within the first compression chamber falling below a preselected level and means for supplying a hydraulic liquid to the second compression chamber upon fluid pressure in said chamber falling below a preselected level.

3. The apparatus of claim 1, wherein the piston face area of the damping piston is greater than either of the piston face areas formed by the first and second piston rod portions, respectively, within the first and second compression chambers.

4. The apparatus of claim 1, wherein the means for restricting fluid flow comprises at least one restrictive orifice formed, respectively, in at least one of the conduit means, the total orifice area being determined by the relationship:

$$A_o = (\omega A_p^2)/(K_p C_o)$$

Wherein $A_o$ is the total orifice area, $\omega$ is the resonant frequency of the hydraulic actuator and load, $A_p$ is the piston face area of the damping piston, $K_p$ is the hydraulic spring rate of the hydraulic liquid within the compression chambers, and $C_o$ is a constant having an approximate value of 3.0.

5. The apparatus of claim 1, further comprising:

means urging the damping piston to a central position within the damping piston chamber.

6. The apparatus of claim 5, wherein the means urging the damping piston to a central position comprises a first coiled spring mounted coaxially within the first cavity and a second coil spring mounted coaxially within the second cavity.

7. In combination with a hydraulic actuator of the type having a piston slidably mounted within a piston chamber and dividing the chamber into first and second chamber portions, an apparatus for damping vibrations occurring within the hydraulic actuator, the apparatus comprising:

conduit means communicating between the first and second chamber portions for relieving undesired increases in pressure occurring in either one of the chamber portions;

a damping piston chamber, having an axis, connected in series with the conduit means;

a damping piston slidably and sealingly seated within the damping piston chamber and moveable axially within the chamber in first and second, mutually opposite directions;

first liquid spring means, external of the damping piston chamber, for resiliently opposing movement of the damping piston in the first direction;

second liquid spring means, external of the damping piston chamber, for resiliently opposing movement of the damping piston in the second direction; and means for connecting the first and second liquid spring means to the damping piston.

8. The apparatus of claim 7, wherein the connecting means comprising a piston rod having first and second end portions connected to the damping piston and extending from the damping piston in mutually opposite directions along the axis of the damping piston chamber and wherein first and second liquid-filled chambers are disposed on the axis of the damping piston chamber on opposite sides of the damping piston and enclosing the first and second piston rod end portions, the first liquid spring means comprising the first liquid-filled chamber and the first piston rod end portion and the second liquid spring means comprising the second liquid-filled chamber and the second piston rod end portion.

* * * * *